United States Patent [19]
Bryan et al.

[11] Patent Number: 5,565,926
[45] Date of Patent: Oct. 15, 1996

[54] METHOD AND APPARATUS FOR COMMUNICATING DIGITAL TELEVISION SIGNALS USING A SIGNAL CONSTELLATION FORMED BY FOUR SIGNAL CONSTELLATIONS PLACED IN THE QUADRANTS

[75] Inventors: David A. Bryan, Danbury, Conn.; Carlo Basile, Ossining; Samir N. Hulyalkar, White Plains, both of N.Y.

[73] Assignee: Philips Electronics North America Corporation, New York, N.Y.

[21] Appl. No.: 366,136

[22] Filed: Dec. 29, 1994

Related U.S. Application Data

[63] Continuation-in-part of Ser. No. 114,545, Aug. 31, 1993, which is a continuation-in-part of Ser. No. 60,181, May 7, 1993, abandoned.

[51] Int. Cl.⁶ ........................................ H04N 7/26
[52] U.S. Cl. ........................ 348/426; 325/265; 325/295
[58] Field of Search .................................. 348/441, 384, 348/390, 469, 22, 426; 375/244, 265, 295; H04N 7/26

[56] References Cited

U.S. PATENT DOCUMENTS 4,247,944  1/1981  Sifford .
5,086,340  2/1992  Citta et al. .
5,087,975  2/1992  Citta et al. .
5,105,442  4/1992  Wei .
5,164,963  11/1992 Lawrence et al. .
5,214,656  5/1993  Chung et al. .
5,243,428  9/1993  Challapali et al. .
5,267,021  11/1993 Ramchandran et al. .
5,305,352  4/1994  Calderbank et al. ............... 375/295
5,307,377  4/1994  Chouly et al. ....................... 375/244
5,315,617  5/1994  Guida et al. ........................ 348/441
5,321,725  6/1994  Paik et al. .......................... 348/155
5,396,518  3/1995  How .................................... 375/265
5,398,073  3/1995  Wei ..................................... 348/432

*Primary Examiner*—Victor R. Kostak
*Attorney, Agent, or Firm*—Michael E. Marion

[57] ABSTRACT

A method and apparatus for transmitting a digital television signal using a first multipoint constellation comprised of a plurality of identical second constellations each having fewer points than the first constellation and each positioned in a different section of the first constellation. The receiver includes a decoder which decodes data as encoded in one of the second constellations. Additional bits, transmitted with the data, are also decoded at the receiver to identify which to section of the first constellation the second constellation belongs.

8 Claims, 4 Drawing Sheets

MAPPING OF 3 BITS ON THE 8 VSB CONSTELLATION.

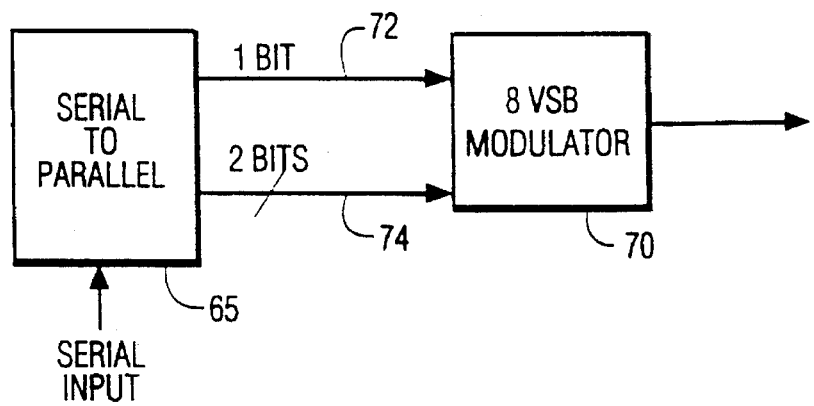
FIG. 4a BLOCK DIAGRAM OF THE 8VSB TRANSMITTER INCORPORATING PROGRESSIVE INFORMATION.
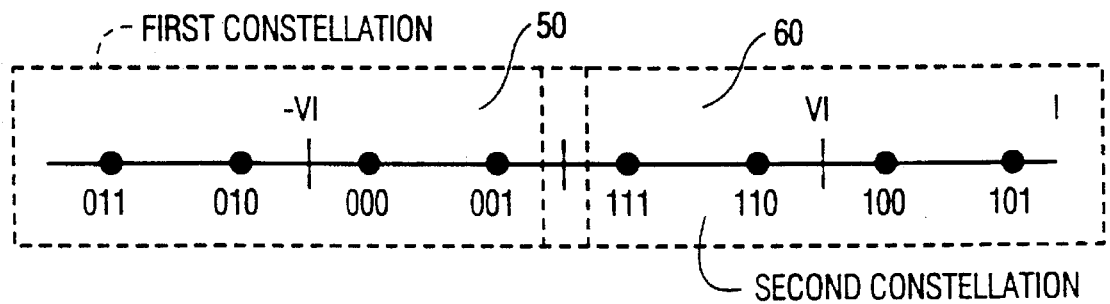
FIG. 4b MAPPING OF 3 BITS ON THE 8 VSB CONSTELLATION.
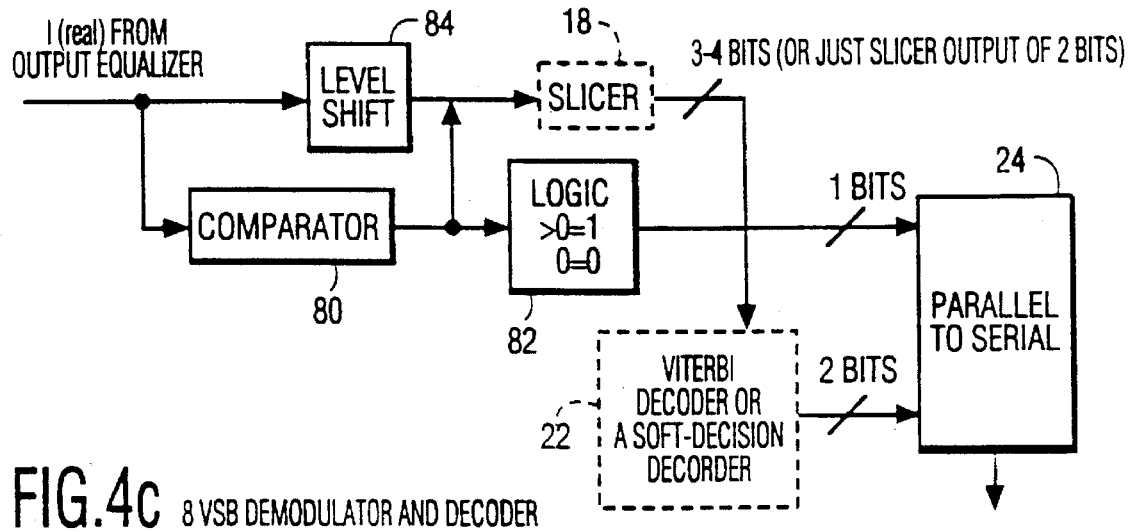
FIG. 4c 8 VSB DEMODULATOR AND DECODER

METHOD AND APPARATUS FOR COMMUNICATING DIGITAL TELEVISION SIGNALS USING A SIGNAL CONSTELLATION FORMED BY FOUR SIGNAL CONSTELLATIONS PLACED IN THE QUADRANTS

This applicant is a continuation in part of U.S. Ser. No. 114,545 filed on Aug. 31, 1993 (abandoned in error by PTO, petition pending) which is itself a continuation in part of Ser. No. 08/060,181 (abandoned) filed on May 7, 1993, the contents of which are incorporated by reference herein.

BACKGROUND OF THE INVENTION

The Federal Communications Commission and cable television testing organizations such as Cable Labs, have been evaluating digital television delivery systems in order to choose a new television "standard" which someday will replace NTSC in the United States. These systems all involve digital coding and data compression techniques, for example those utilizing the MPEG algorithm or variations thereof. MPEG is discussed in U.S. Pat. No. 5,243,428 which is incorporated by reference herein.

Several systems, such as those demonstrated by the Advanced Television Research Consortium and the American Television Alliance, propose using quadrature amplitude modulation (QAM) or Vestigial Sideband (VSB) modulation techniques in the transmission of the coded television information.

The FCC plans to test and approve an HDTV standard for terrestrial broadcasting in 1995. Although the specifics of the standard are yet to be fully tested and agreed upon, the FCC has indicated that the system will initially take the form of a so called "simulcast" approach. The new HDTV signals will have to fit into currently unused television channels (so-called "taboo" channels) and initially co-exist with conventional analog television signals without co-channel interference.

NTSC will be used hereinafter to represent one example of conventional television broadcasting. Other examples would be SECAM and PAL. Although NTSC is exemplified herein, it is not meant to be construed as a limitation and will be used herein synonymously with "conventional" to represent conventional television in general.

The system proposed by the ATRC utilizes quadrature amplitude modulation (QAM) and a 32 point constellation, defining points each having a "real" value which is transmitted on a subcarrier "in phase" and an "imaginary" value which is transmitted 90 degrees out of phase (in quadrature) from the "real" value, to encode multibit code words of data into complex symbols transmitted on the channel.

Another digital transmission approach suggested by Zenith Electronics Corp. transmits just the "real" values of a constellation as a four level data signal which is transmitted using vestigial sideband modulation. This approach, known also as "4 VSB" is described in U.S. Pat. Nos. 5,086,340 and 5,087,975 which are incorporated by reference herein.

A discussion of both QAM and VSB digital modulation methods can be found in the article "Performance of Digital Modulation Methods", *Communications Technology*, May 1992. This article is incorporated by reference herein.

In order to minimize or prevent co-channel interference, the system chosen by the FCC will have to maximize the use of the available bandwidth. For this reason, systems proposed thus far have only proposed the transmission of 1050 interlaced lines of resolution or 787.5 progressive lines of resolution at a 60 frame/second rate.

Because of the co-channel interference due to the frequency re-use implied by "simulcasting", true high resolution progressive transmission will be difficult at a 60 frame/second rate. The FCC intends however, to end NTSC broadcasting at some, yet to be chosen, date after introduction of HDTV. It is expected that by the time a genuine market need for progressively scanned high definition video material is established, the NTSC transmissions will have been ended. At that time, all of the existing NTSC channels will be reassigned for HDTV service. This will remove the limitation currently in place on the transmission characteristics of the HDTV signal, allowing the migration from the proposed QAM systems (for example 32 QAM using a 32 point constellation QAM modem) to a higher capacity QAM system (for example a 128 QAM using a 128 point constellation QAM modem) which can be utilized to provide information which can augment the interlaced HDTV signal or provide high resolution progressively scanned programming. Similar migration is possible from a "simulcast" multilevel VSB system to a higher capacity VSB system (for example from a 4 VSB system to an 8 VSB system).

One object of the instant invention, is to design a transmission system which can be used as part of the FCC's "simulcast" standard while conventional broadcasting continues, but which can easily be upgraded to a higher level when "simulcast" ends.

Another object of the instant invention is to provide a television receiver which will receive the "simulcast" HDTV broadcast and remain compatible with future HDTV systems which will provide augmentation information to new generations of receivers capable of receiving and processing this information.

Another object is to design a transmission system which will enable HDTV set manufacturers to design television receivers today which will receive and display the "simulcast" HDTV signal, and also be easily upgradable so as to receive and display the higher level transmissions of the future.

SUMMARY OF THE INVENTION

The invention improves upon prior art digital encoding schemes which encode respective multibit code words as unique points defined on, for example, a rectangular constellation wherein each point has a respective ordinate and coordinate location within the constellation. Respective points in such a constellation can be identified by stating the ordinate ("real" value) and coordinate ("imaginary value") of each point. If a VSB digital transmission method is to be used, only those points having a "real" value (i.e. "imaginary" value of zero) are eligible for transmission.

The improvement provided by the invention, allows the capacity of decoders (and television receivers using such decoders) designed for initial use with data coded using an initial N point constellation, to be easily adapted for use with a larger capacity system handling data coded on an M point constellation, where N is defined as the number of points in the initial constellation and M is a multiple of N points, which M points are arranged as a number of said initial N point constellations. For example, one embodiment of the invention defines a "first" rectangular constellation which is made up of spatially offset versions of four identical "second" rectangular constellations.

As is shown in FIG. 2 for example, the "second" constellation can be a 32 point constellation and therefore the "first" constellation would, in this case, be a 128 point constellation made up of four "second" constellations. Each 32 point constellation is disposed in a respective quadrant of the 128 point constellation. Each point of each 32 point constellation represents a seven bit digital word having identical bits in the five least significant positions. The two most significant bits of each codeword identifies the respective quadrant of the 128 point constellation in which the point is placed. The two bits identifying in which quadrant of the first constellation, a particular point within one of the four second constellations is located, is generated at an encoder comprising the invention and is actually transmitted as part of the digital television signal.

U.S. Pat. No. 4,247,944 (Sifford) describes a simplified method for detecting at the receiver, an angle type constellation, i.e. one having points plotted using polar coordinates rather than rectangular coordinates. Although Sifford briefly discusses the use of a quadrant designating signal or tag, this tag is generated at the receiver and forms no part of the transmitted signal.

Initially television information will be encoded using only, for example, a single 32 bit constellation as shown in FIG. 2 due to current regulations limiting the robustness of the transmitted signal and therefore the two additional transmitted bits would always be the same (for example 00). At some time in the future however, when co-channel interference is no longer a concern, the robustness of the transmitted signal could by increased by coding the television signal using a larger constellation, e.g. the 128 point constellation made up of four 32 point constellations as shown in FIG. 2.

Although the 32 point constellation will be sufficient for coding interlaced video, the 128 point constellation will be needed to code progressive video at some time in the future. In newer television sets equipped to display the progressive information, the 128 point constellation would be directly decoded and displayed. In those receivers equipped only to display interlaced pictures however, the existing decoders comprising the invention (thus equipped for example, to decode the 32 point constellation) could still be used to decode the information coded with the 128 point constellation with the aid of some post processing which uses the additional two bits to identify the quadrant information. Since the basic decoder used in both the "newer" and "older" sets would be the same (since both would decode the same 32 point constellation yielding the same five least significant bits) only transmission of the additional quadrant locating bits would be needed to upgrade the television coding scheme from lower capacity to higher capacity.

One embodiment of the instant invention provides for the increased transmission capacity which future HDTV transmissions will be able to take advantage of (after "simulcasting" ends) by expanding the modem constellation size from the currently proposed 32 point constellation to a 128 point constellation. The current ATRC proposal features a 32 point constellation with rate 0.9 set-partition or trellis coding. There is one additional bit per 2 symbols, or 4.5 bits per symbol.

One embodiment of the invention comprises a 128 point constellation which features four quadrants, each comprising a 32 point constellation which uses the same trellis encoding/decoding scheme as proposed in the ATRC "simulcast" system and also provides an additional two uncoded bits per symbol, e.g. 6.5 bits/symbol, for a transmitted bit rate improvement of 6.5/4.5 or 44%, as compared to the "simulcast" ATRC system. The two additional transmitted bits identify one of the four quadrants. This additional data rate is more than sufficient to encode the progressive scan high definition video which can be utilized after the end of NTSC broadcasting. The additional data rate can also be used to provide other forms of enhanced services to the "simulcast" HDTV signal.

In another embodiment of the invention, for a 4 VSB system, which has 4 b/s/Hz (because it has 2 bits/symbol and its bandwidth is halved using the VSB filter), the later migration can be made to 8 VSB which has 6 b/s/Hz (3 bits/symbol). Hence, for this case the transmitted bit-rate improvement is 6/4 of 50%. For VSB, the invention features two segments (instead of four quadrants) each comprising the original 4 VSB constellation. An extra bit is used to select one of the two segments.

Another feature of the invention is that it provides a transmission system which utilizes the added capacity to transmit information which can be used by an advanced HDTV receiver to supplement the interlaced scanned signal provided by the "simulcast" HDTV signal.

Still another feature of the invention is that it provides a television receiver which, though designed to receive only the "simulcast" HDTV signal, can continue to be used to receive the advanced HDTV signal when it replaces the "simulcast" HDTV signal.

Another feature of the invention provides for a television receiver which can be manufactured to receive both the "simulcast" HDTV signal when implemented by the FCC and the future advanced higher data rate (e.g. progressive) signal which will be implemented when "simulcast" ends.

The 128 point constellation of the preferred embodiment of the invention described herein, comprises four 32 point constellations which are each identically decoded and disposed in each of four quadrants making up the 128 point constellation. In addition to the video data coded on one of the 32 point constellations (which are identical and have identical point values), additional data is also provided to choose which quadrant is to be processed, thereby multiplying the number of possible symbol values four times. In this manner, simple decoding circuitry can be added to all receivers which will choose a non-offset 32 QAM constellation to process "simulcast" HDTV and also will also be able to decode an offset 32 QAM constellation when the additional information transmitted using the 128 point constellation, when such transmissions replace the "simulcast" system. Alternatively, the additional data could be transmitted as augmentation information which is coded on three of the four quadrants with the "simulcast" HDTV signal always being coded in the fourth quadrant, thus providing an upgradable transmission system without "simulcast" HDTV receivers being made obsolete when "simulcast" HDTV and NTSC are replaced by an added capacity "advanced" HDTV signal.

Of course, interlaced "simulcast" sets will not be able to display the progressive scan information and appropriate post processing will be necessary to display the received signal in interlaced form. All sets however, will at least be able to receive and provide an output from the higher level transmissions when they become a reality.

The embodiments described herein relate to transmission systems designed for terrestrial broadcasting. It should be noted however, that the invention is not limited to such systems and can equally be used in cable, microwave, DBS and recording/playback systems as well. "Transmission" as defined herein, is therefore intended to encompass all forms of transmission/reception and/or recording/playback.

BRIEF DESCRIPTION OF THE DRAWINGS

FIG. 4a is a block diagram of an encoder comprising a VSB embodiment of the invention;

FIG. 4b describes an eight point "real" value signal linear constellation comprising the invention; and FIG. 4c is a block diagram of a VSB receiver comprising the invention;

DETAILED DESCRIPTION OF PREFERRED EMBODIMENTS OF THE INVENTION

Figure 1:
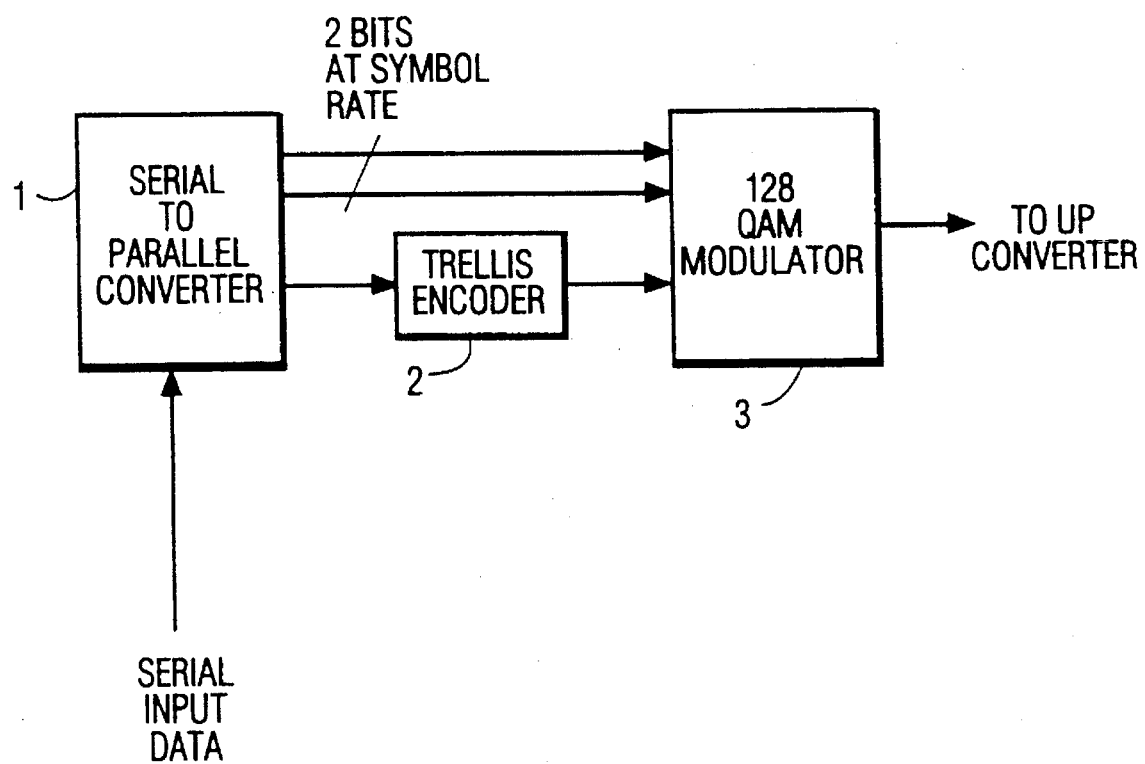
FIG. 1 is a block diagram of an encoder comprising a QAM embodiment of the invention.

FIG. 1 shows a block diagram of one embodiment of a 128 QAM encoder comprising the invention.

Using known encoding methods, such as those described in the references incorporated herein, video and audio sources are converted to digital data, compressed and multiplexed with auxiliary information and forward error correction data into a serial data stream. The serial data enters serial-to-parallel converter 1, where it is formed into parallel digital words representing symbols to be transmitted.

Figure 2:
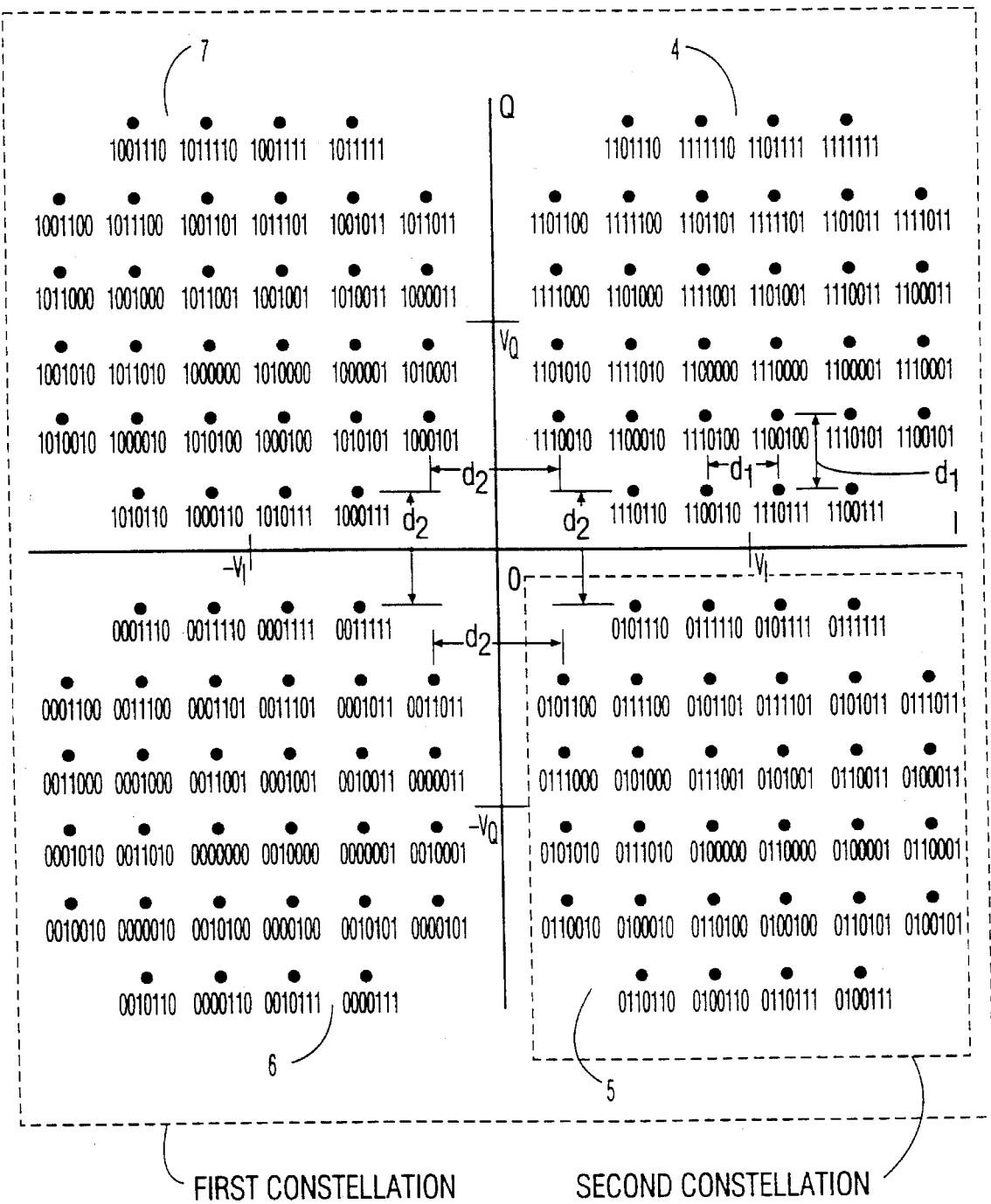
FIG. 2 describes a 128 point complex signal constellation comprising the invention.

In accordance with one embodiment of the invention, data for selecting a quadrant within the 128 point first constellation shown in FIG. 2, can be added to the serial input data stream provided to serial to parallel converter 1. The quadrant selection data can be combined with the serial data words as provided by the HDTV system proposed by the ATRC, and two bits signifying the quadrant are provided at every symbol time while nine bits are output at intervals of two symbol times.

The two quadrant selection bits of each word pass from serial to parallel converter 1 directly to the 128 QAM Modulator 3 and the remaining bits are processed by a trellis coder 2. Trellis coding is used to protect the digital words mapped into 32 constellation points each representing a complex symbol. Each complex symbol represents five bits of information. Since the input data stream flowing to the trellis coder 2 from the serial to parallel converter 1 is at a rate of four and a half bits/symbol time, the excess capacity of one half of a bit/symbol time is used to introduce redundancy that permits error correction to take place at a receiver. Trellis coder 2, outputs therefore, ten bits of information for every nine bits which are input from serial to parallel converter 1.

The 128 point "first" constellation is shown in FIG. 2, along with the mapping of symbol bits from trellis coder 2, to respective constellation points which is performed by 128 QAM modulator 3 of FIG. 1.

The 128 point constellation of the invention is configured by placing each of four 32 point "second" constellations into respective quadrants 4, 5, 6 and 7. The two most significant bits, which are the two bits provided directly to the 128 QAM modulator from serial to parallel converter 1, select the quadrant in which the five least significant bits, which represent the second constellation complex symbols provided by the trellis encoder 2, will be placed.

The 128 QAM modulator 3 outputs an Q signal and an I signal which are up converted and transmitted as described in the references incorporated herein.

At a receiver, I and Q signals are received and using the logic rules shown in Table I the values of the two most significant bits (MSBs) of the data word are determined which also determines the quadrant for which the second constellation complex symbols are coded for that data word.

TABLE I

| I | Q | Two MSBs | Quadrant |
| --- | --- | --- | --- |
| >0 | >0 | 11 | 4 |
| >0 | <0 | 01 | 5 |
| <0 | >0 | 10 | 7 |
| <0 | <0 | 00 | 6 |

Figure 3:
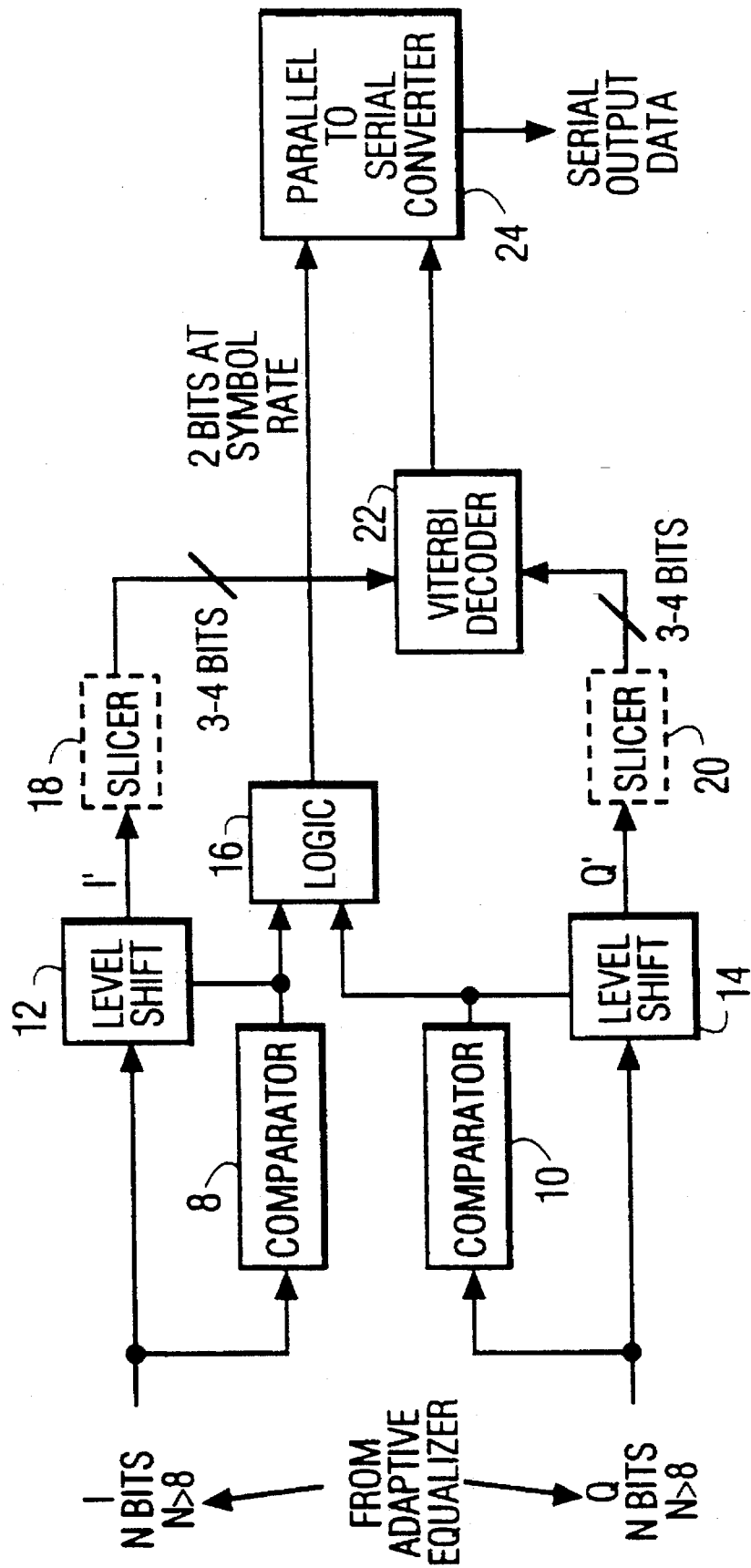
FIG. 3 is a block diagram of a QAM receiver comprising the invention.

FIG. 3 shows a block diagram of a receiver which utilizes the currently proposed ATRC 32 QAM HDTV signal and the future 128 QAM HDTV signal coded in accordance with the invention. A conventional QAM receiver architecture including an adaptive equalizer, as described in the references incorporated herein, can be used to receive an HDTV signal coded in accordance with the invention and to provide therefrom I and Q signals having values which are represented by N bits where N is >eight bits.

The I and Q signals enter two comparators 8 and 10 respectively, whose function is to test whether or not each I or Q signal is greater or less than zero. Based on these two comparisons, the two most significant bits of the transmitted symbol can be determined by the logic unit 16 according to the rules shown in Table I.

The two level shifters 12 and 14, are used to spatially re-center the selected one of the four possible 32 point constellations comprising the 128 point constellation represented by each I and Q signal combination, so that its origin I,Q=(0,0). For level shifter 12 this is expressed as:

If $I>0$, then $I'=I-VI$

If $I<0$, then $I'=I+VI$;

and for level shifter 14, as:

If $Q>0$, then $Q'=Q-VQ$

If $Q<0$, then $Q'=Q+VQ$; and where VI is a spatial value which is halfway along the I axis of quadrants 4 and 5, −VI is a spatial value which is halfway along the I axis of quadrants 7 and 6, VQ is a spatial value which is halfway along the Q axis of quadrants 7 and 4 and −VQ is a spatial value which is halfway along the Q axis of quadrants 6 and 5, as shown on FIG. 2 and VI=VQ.

The I and Q signals from the adaptive equalizer are quantized to >8 bits. However, it is well known that for trellis decoding as performed by Viterbi decoder 22 it is not necessary to retain more than 3–4 bits for near-optimal performance, therefore the I' and Q' signal values can be truncated in slicers 18 and 20 respectively before being provided to the Viterbi decoder 22. A suitable Viterbi decoder is manufactured by Qualcomm, Inc., San Diego, Calif., and is described in Application Note AN1650-2, published by Qualcomm, Inc., the contents of which is incorporated by reference herein.

The Viterbi decoder 22 outputs its best approximation of the least significant bits (LSBs) of the transmitted symbol to parallel to serial converter 24. This will be nine bits at intervals of two symbol times. The parallel to serial converter 24, using the additional MSBs provided by logic unit 16 to identify the quadrant the LSBs belong to, then outputs a serial stream of data representing the receiver's best approximation of the data encoded by the encoder of FIG. 1.

As shown in FIG. 2, the two MSBs of a symbol may be received more robustly (have "higher priority") if the distance d2 is made greater than the distance d1. This may be advantageous in the transmission of compressed digital video as there is generally some information that is more important than other information. The more important information can be sent on the two MSBs with d2>d1. For example we could have: (2 bits/symbol divided by 6.5 bits/symbol)=31% high priority data in the ATRC example described above.

In the case where d2>d1 we have:

$$VI=VQ=0.5 \ (d2+5*d1)$$

whereas, if $d2=d1$, $VI=VQ=3*d1$

The receiver must be able to switch in a seamless fashion when the service is changed from 32 QAM to 128 QAM. This could be done in a number of ways. The simplest is by trial and error. If the modem finds that it suddenly has a lot of errors and after repeated resets, the performance is not improved then it will switch over to the 128 QAM mode. The other technique is by use of the 'rate sequence' proposed in the parent application. The information about what modulation is currently being used can be provided by using the 'rate sequence'. Another technique is by noting that when 128 QAM is sent there is almost no energy in the region around the origin. Thus a frequency counter can be used to detect the number of occurrences of the four constellation points around the origin for the 32 point constellation and if this on the average has a much smaller probability than the rest of the points, then it can be concluded that the service has changed to 128 QAM.

The above embodiment focuses on extending the existing HDTV proposals of the ATRC to higher level progressive scanning systems, however the same ideas can be implemented in connection for example, with the QAM "simulcast" proposal by General Instrument and any suitable trellis code can be used with the proposed scheme. This is to say that since the essence of the idea is to create a constellation with four times the number of points by combining four spatially offset versions of a smaller constellation, any applicable constellation can be used to form each quadrant and is not limited to 32 QAM. For example, if the data rate is sufficient, we might have a 16 QAM constellation within each quadrant, or an overall 64 QAM constellation.

The invention is also compatible with the multiplexed QAM scheme described in the parent application. For example we could have 64 QAM for audio data and 128 QAM for video data, for more robust audio.

As shown in FIG. 2, the two MSBs of a symbol may be received more robustly (have "higher priority") if the distance d2 is made greater than the distance d1. This may be advantageous in the transmission of compressed digital video as there is generally some information that is more important than other information. The more important information can be sent on the two MSBs with d2>d1. For example we could have: (2 bits/symbol divided by 6.5 bits/symbol)=31% high priority data in the ATRC example described above.

In the case where d2>d1 we have:

$$VI=VQ=0.5 \ (d2+5*d1)$$

whereas, if $d2=d1$, $VI=VQ=3*d1$

The receiver must be able to switch in a seamless fashion when the service is changed from 32 QAM to 128 QAM. This could be done in a number of ways. The simplest is by trial and error. If the modem finds that it suddenly has a lot of errors and after repeated resets, the performance is not improved then it will switch over to the 128 QAM mode. The other technique is by use of the 'rate sequence' proposed in the parent application. The information about what modulation is currently being used can be provided by using the 'rate sequence'. Another technique is by noting that when 128 QAM is sent there is almost no energy in the region around the origin. Thus a frequency counter can be used to detect the number of occurrences of the four constellation points around the origin for the 32 point constellation and if this on the average has a much smaller probability than the rest of the points, then it can be concluded that the service has changed to 128 QAM.

FIGS. 4a–4c describe another embodiment of the invention which is suitable for VSB digital transmission.

As shown in FIG. 4b, the first constellation contains only "real" values (imaginary values are zero). It is comprised of two second constellations 50 and 60.

As discussed above, the currently proposed 4 VSB system would utilize only a second 4 point constellation, e.g. 50. Should the capacity of the HDTV system be increased at sometime in the future, for example by replacing interlaced video with progressive video, the 4 point constellation could be easily expanded into an 8 point constellation by adding, at the encoder, an additional bit which would indicate to which segment, 50 or 60, the 4 point encoded data belongs.

The 8 point "first" constellation is shown in FIG. 4b, along with the mapping of symbol bits from serial to parallel converter 65, to respective real constellation points which is performed by 8 VSB modulator 70.

The 8 point first constellation is configured by placing each of two 4 point "second" constellations into respective segments 50 and 60. The most significant bit, which is provided to the 8 VSB modulator 70 from serial to parallel converter 65 over bus 72, selects the segment in which the two least significant bits, which represent the second constellation symbols provided by serial to parallel converter 65 over bus 74, will be placed.

The 8 VSB modulator 70 outputs a signal value corresponding to the 3 bit codeword which is up converted and transmitted as described in the references incorporated herein.

As shown in FIG. 4c, the signal from the adaptive equalizer (not shown) enters comparator 80, whose function is to test whether or not the signal is greater or less than zero.

TABLE II

| MSB | Segment |
|---|---|
| I > 0 | 60 |
| I < 0 | 50 |

The level shifter 84 is used to spatially locate the selected one of the two possible 4 point constellations comprising the 8 point constellation. For level shifter 84 this is expressed as:

If $I>0$, then $I'=I-VI$

If $I<0$, then $I'=I+VI$;

where VI is a spatial value which is halfway along the I axis of segment 60 and −VI is a spatial value which is halfway along the I axis of segment 60.

The I signal from the adaptive equalizer is quantized to>8 bits. However, it is well known that for trellis decoding as performed by Viterbi decoder 22 it is not necessary to retain more than 3–4 bits for near-optimal performance, therefore the I signal value can be truncated in slicer 18 re being provided to the Viterbi decoder 22.

The Viterbi decoder 22 outputs its best approximation of the two least significant bits (LSBs) of the transmitted symbol to parallel to serial converter 24. The parallel to serial converter 24, using the additional bit provided by logic unit 82 as the most significant bit to identify the segment the LSBs belong to, then outputs a serial stream of data representing the receiver's best approximation of the data encoded by the encoder of FIG. 4a.

We claim:

1. A method for transmitting a modulated digital television signal using a first signal constellation having a plurality of sections, said method comprising the steps of:
   a) forming a plurality of first data portions from a source of television information;
   b) coding said first data portions using a second signal constellation having fewer points than said first signal constellation so as to form second data portions;
   d) providing a third data portion indicating for each of said first data portions, a respective section of said first signal constellation; and
   e) modulating each said second data portion in a manner which utilizes its respective third data portion to form respective data words each representing a respective position within said second constellation and said respective section within said first constellation in which said respective second constellation is disposed.

2. A method for decoding the digital television signal of claim 1, said method comprising the steps of:
   a) receiving said digital television signal;
   b) demodulating said data words from said digital television signal;
   c) decoding respective said second and third data portions from each of said data words; and
   d) decoding respective first data portions from each of respective second and third data portions.

3. An apparatus for transmitting a modulated digital television signal using a first signal constellation having a plurality of sections, said apparatus comprising in combination:
   a) means for forming a plurality of first data portions from a source of television information;
   b) means for coding said first data portions using a second signal constellation having fewer points than said first signal constellation so as to form second data portions;
   d) means for providing a third data portion indicating for each of said first data portions, a respective section of said first signal constellation; and
   e) means for modulating each said second data portion in a manner which utilizes its respective third data portion to form respective data words each representing a respective position within said second constellation and said respective section within said first constellation in which said respective second constellation is disposed.

4. An apparatus for decoding the digital television signal of claim 3, said apparatus comprising in combination:
   a) means for receiving said digital television signal;
   b) means for demodulating said data words from said digital television signal;
   c) means for decoding respective said second and third data portions from each of said data words; and
   d) means for decoding respective first data portions from each of respective second and third data portions.

5. The apparatus of claim 3, wherein said television information is progressively scanned.

6. The apparatus of claim 4, wherein said television information is progressively scanned.

7. A method for transmitting a quadrature amplitude modulated digital television signal using a first signal constellation defined on a rectangular grid and having four quadrants, said method comprising the steps of:
   a) forming a plurality of first data portions from a source of television information;
   b) coding said first data portions using four second signal constellations each defined on said rectangular grid and having fewer points than said first signal constellation, and each of said second constellations disposed in a respective one of said four quadrants so as to form second data portions;
   d) providing a third data portion indicating for each of said first data portions, a respective quadrant of said first signal constellation; and
   e) modulating each said second data portion in a manner which utilizes its respective third data portion to form respective data words each representing a respective position within said second constellation and said respective quadrant within said first constellation in which said respective second constellation is disposed.

8. An apparatus for transmitting a vestigial sideband modulated digital television signal using a first signal constellation having two sections defined on a linear grid, said apparatus comprising in combination:
   a) means for forming a plurality of first data portions from a source of television information;
   b) means for coding said first data portions using two second signal constellations each defined on said linear grid and having fewer points than said first signal constellation, and each of said second constellations disposed in a respective one of said two sections so as to form second data portions;
   d) means for providing a third data portion indicating for each of said first data portions, a respective section of said first signal constellation; and
   e) means for modulating each said second data portion in a manner which utilizes its respective third data portion to form respective data words each representing a respective position within said second constellation and said respective section within said first constellation in which said respective second constellation is disposed.

* * * * *